US005511009A

United States Patent [19]

Pastor

[11] Patent Number: 5,511,009

[45] Date of Patent: Apr. 23, 1996

[54] ENERGY-BASED PROCESS FOR THE DETECTION OF SIGNALS DROWNED IN NOISE

[75] Inventor: Dominique Pastor, Saint Loubes, France

[73] Assignee: Sextant Avionique, Meudon La Foret, France

[21] Appl. No.: 224,517

[22] Filed: Apr. 7, 1994

[30] Foreign Application Priority Data

Apr. 16, 1993 [FR] France .................................. 93 04519

[51] Int. Cl.[6] .................................................... H04B 15/00

[52] U.S. Cl. ............................................ 364/572; 364/574

[58] Field of Search .................................... 364/572, 574, 364/575; 381/46, 47, 48, 49, 50, 51, 94; 395/2.42

[56] References Cited

U.S. PATENT DOCUMENTS

| | | | |
|---|---|---|---|
| 4,630,304 | 12/1986 | Borth et al. | 381/94 |
| 4,905,286 | 2/1990 | Sedgwick et al. | 381/43 |
| 4,984,275 | 1/1991 | Watanabe et al. | 381/43 |
| 5,319,736 | 6/1994 | Hunt | 395/2.36 |
| 5,337,251 | 8/1994 | Pastor | 381/46 |

FOREIGN PATENT DOCUMENTS

| | | |
|---|---|---|
| 0451796A1 | 10/1991 | European Pat. Off. . |
| 0518742A1 | 12/1992 | European Pat. Off. . |

OTHER PUBLICATIONS

Merhav, "Universal classification for Hidden Markov Models", IEEE Transactions on Information Theory, vol. 37, No. 6, Nov. 1991, New York, pp. 1586–1594.

Sims, "A Speech To Noise Ratio Measurement Algorithm", Journal Of The Acoustical Society Of America, vol. 78, No. 5, Nov. 1985, pp. 1671–1674.

Kay, et al. "Spectrum Analysis—A Modern Perspective", Proceedings Of The IEEE, vol. 69, No. 11, Nov. 1981, New York, pp. 1380–1419.

Boll, et al. "Suppression of Acoustic Noise in Speech Using Spectral Substraction", vol. 27, No. 2, Apr. 1979, New York, pp. 113–120.

*Primary Examiner*—James P. Trammell

*Attorney, Agent, or Firm*—Oblon, Spivak, McClelland, Maier & Neustadt

[57] ABSTRACT

The energy-based process according to the invention for the detection of useful signals drowned in noise consists of starting from a frame of samples of a noisy signal grouped in successive frames, making a pre-classification by comparing the energies of successive samples of each frame with a determined optimum threshold and sorting samples which have a high probability of belonging to a "noise only" class into this class, and then for each of these samples detecting those that have a sufficiently high energy so that they have a high probability of belonging to a "noise+useful signal" class, this second class being defined using the first class as a reference.

21 Claims, 4 Drawing Sheets

ENERGY-BASED PROCESS FOR THE DETECTION OF SIGNALS DROWNED IN NOISE

BACKGROUND OF THE INVENTION

This invention concerns an energy-based process for the detection of signals drowned in noise.

Detection tools for a signal for which there is an available model are widely available in the literature, the best known methods being based on the adapted filter concept and, more generally, on the signal processing decision theory (P. Y. ARQUES, Collection Technique et Scientifique des Tél écommunications, MASSON). These techniques are used to generate consistent and non-consistent receivers in digital communications (Principle of Coherent Communication A. J. VITERBI, MacGraw-Hill).

However this invention is applicable to the case in which there is no model that can be used for direct application of detection theory. We assume that we are in the presence of background noise, in which an "anomaly" occurs from time to time that, depending on the context, may represent a signal that it would be desirable to detect.

There are many examples in the literature of detection of a "useful" signal in noise, concerning speech detection. Due to its large variability, the speech signal cannot be easily and efficiently modelled and one of the most natural means of detecting it is to perform energy thresholding.

Thus a great deal of research is being carded out at the present time about the instantaneous amplitude with reference to an experimentally determined threshold (Speech-noise discrimination and its applications V. PETIT, F. DUMONT THOMSON-CSF Technical Review—Vol. 12—No. 4— December 1980), or by empirical energy thresholding ("Suppression of Acoustic Noise in Speech Using Spectral Subtraction", S. F. BOLL, IEEE Transactions on Acoustics, Speech, and Signal Processing, Vol. ASSP-27, No. 2, April 1979), or on the total signal energy during a time slice of duration T, by still experimentally thresholding this energy using, for example, local histograms ("Probl ème de détection des frontières de mots en présence de bruits additifs", P. WACRENIER, Mémoire de D.E.A. de l'université de PARIS-SUD, Centre d'ORSAY—Problem of detecting word boundaries in the presence of additive noise, P. WACRENIER, University of Paris-South, Orsay Center, further studies thesis). Other techniques are presented in "A Study of Endpoint Detection Algorithms in Adverse Conditions: Incidence on a DTW and HMM Recognizer", J. C. JUNQUA, B. REAVES, B. MAK EUROSPEECH 1991.

Heuristics is used widely m all these methods, and few powerful theoretical tools are used.

We should also mention work presented in "Evaluation of Linear and Non-Linear Spectral Subtraction Methods for Enhancing Noisy Speech", A. LE FLOC'H, R. SALAMI, B. MOUY and J-P. ADOUL, Proceedings of "Speech Processing in Adverse Conditions", ESCA WORKSHOP, CANNES-MANDELIEU, 10–13 Nov. 1992, in which all energy exceeding a given experimental threshold is considered to reveal the presence of a useful signal, and all energy below this threshold is considered to be energy due to noise alone when the normal distance (absolute value of the difference) separating them is below a threshold that is also experimental. However in this document written by the Le Floc'h et al, the authors work on the concept of a distance between energies, but the distance used is a single absolute value of the difference of the energies and their work makes considerable use of heuristics.

SUMMARY OF THE INVENTION

The object of this invention is an energy-based process for the detection of useful signals drowned in noise, a process that essentially makes use of rigorous techniques with very little use of heuristics, and that is optimized, in other words it can be used to detect practically all useful signals drowned in noise, even intense noise, with the lowest possible false detection rate.

The process according to the invention consists of performing a preclassification starting from a set of samples of a noisy signal grouped in successive flames, by comparing the energies of successive frames with each other, using a distance which is the absolute value of the difference of the logarithms of the two energies, in order to sort flames with a strong probability of belonging to this class into a first "noise only" class, then for the other frames that have sufficiently high energy with respect to a reference energy calculated using the energies of the "noise only" frames, such that these detected frames have a strong probability of belonging to a second "noise+useful signal" class.

The process according to the invention assumes that when the useful signal is present, the energy of the observed signal belongs to a certain class denoted $C_1$, and that when the useful signal is absent, the observed energy belongs to a class denoted $C_2$. One of the new characteristics of this invention is that it can demonstrate this type of energy in class $C_2$ (noise only energy) that are then used in an optimized process to optimize the detection of energies in class $C_1$ (therefore energy revealing the presence of a useful signal).

DETAILED DESCRIPTION OF THE PREFERRED EMBODIMENTS

Figure 1:
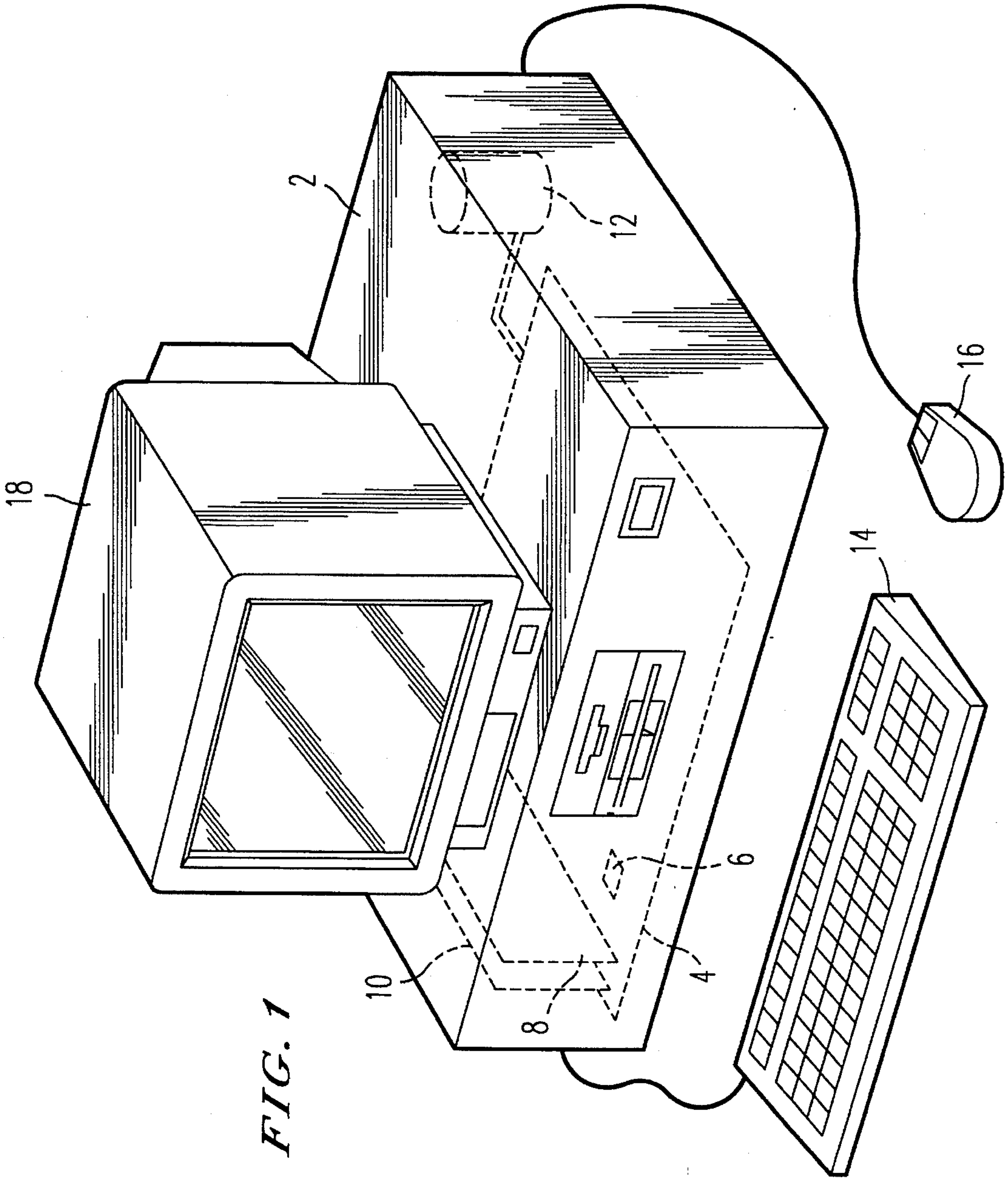
FIG. 1 is a schematic of a computer system used to perform the method according to the present invention.
Figure 2:
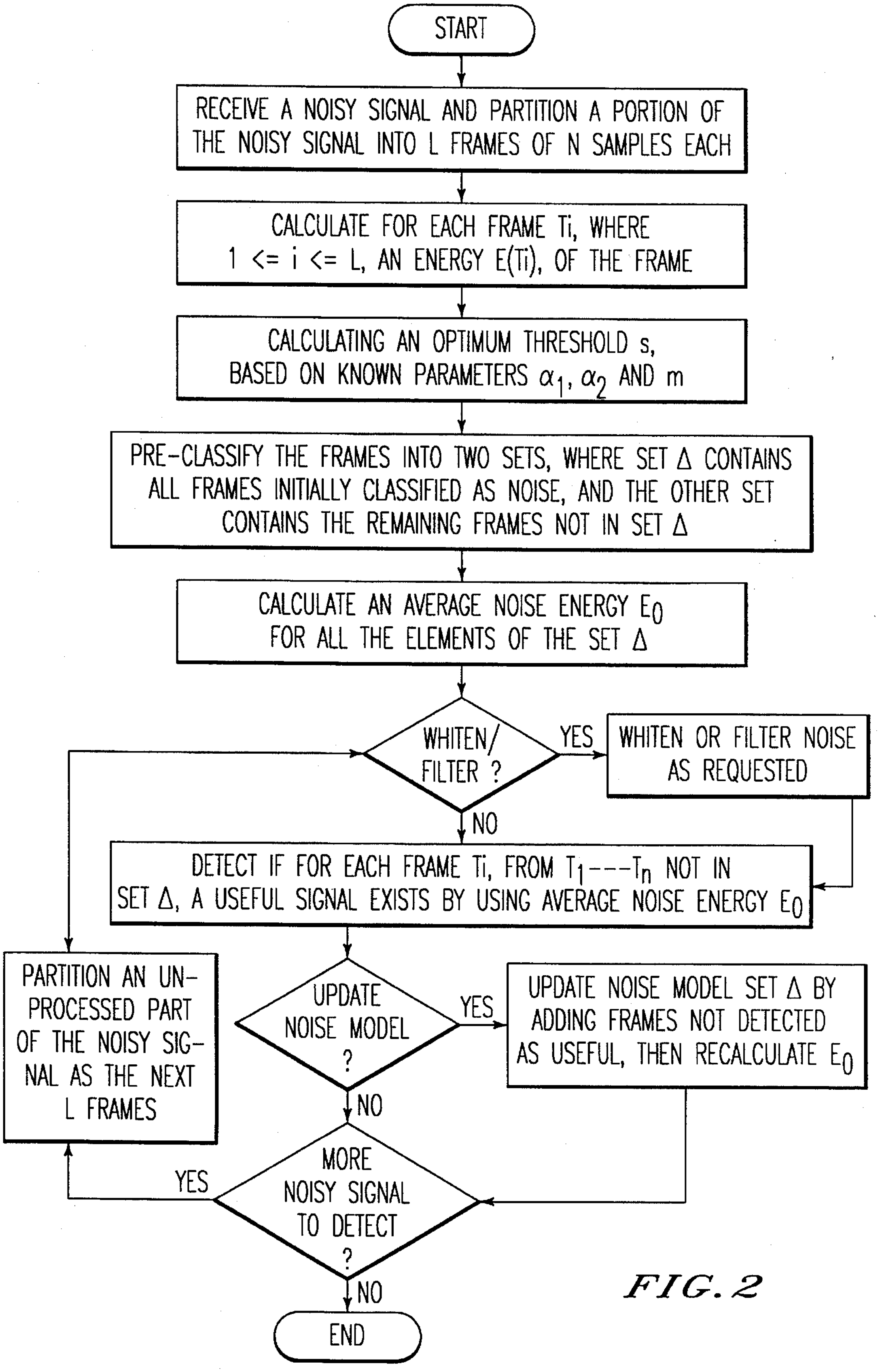
FIG. 2 is a flowchart showing the general operation of the present invention.
Figure 3:
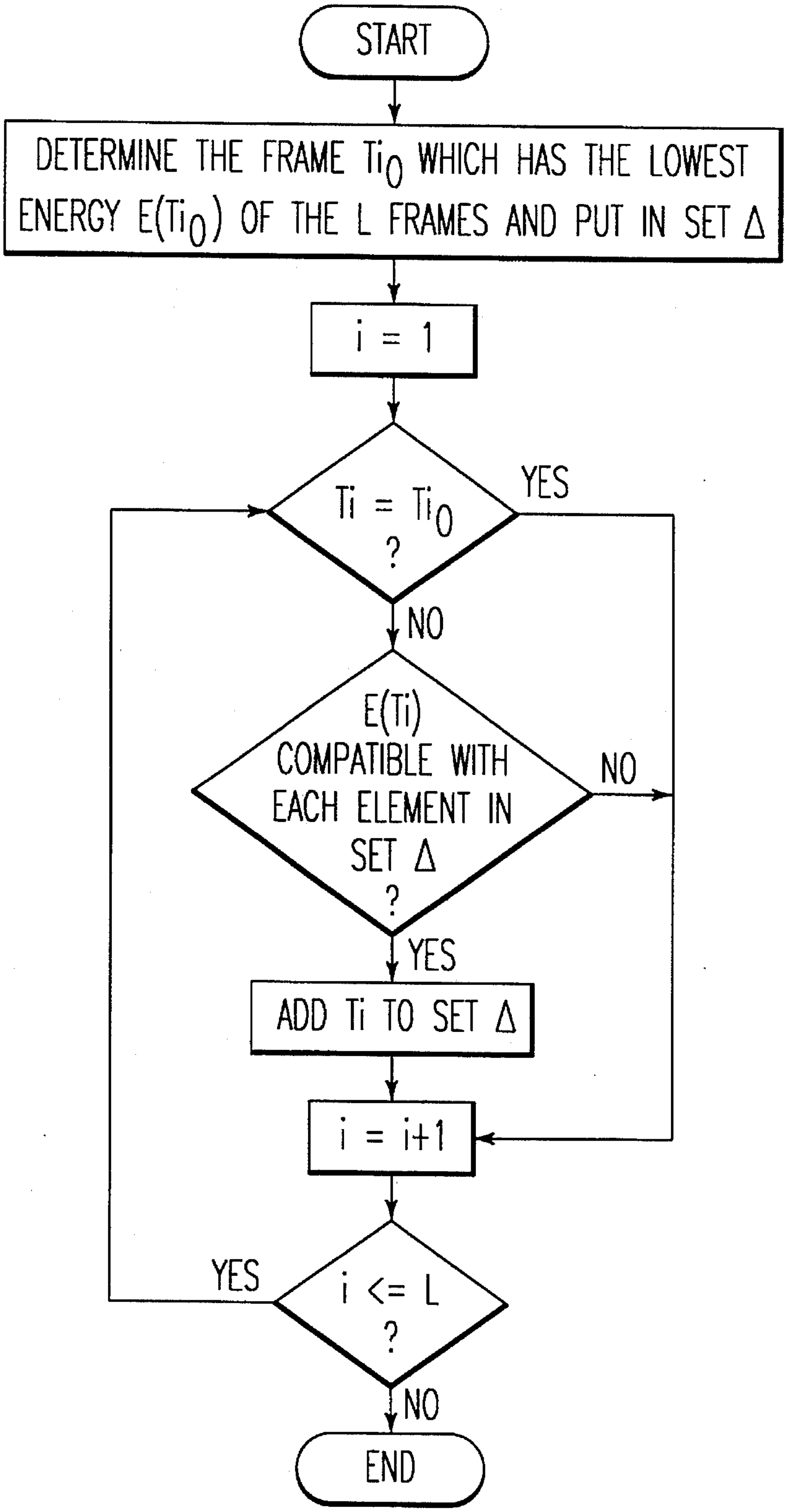
FIG. 3 is a flowchart depicting the pre-classification step.
Figure 4:
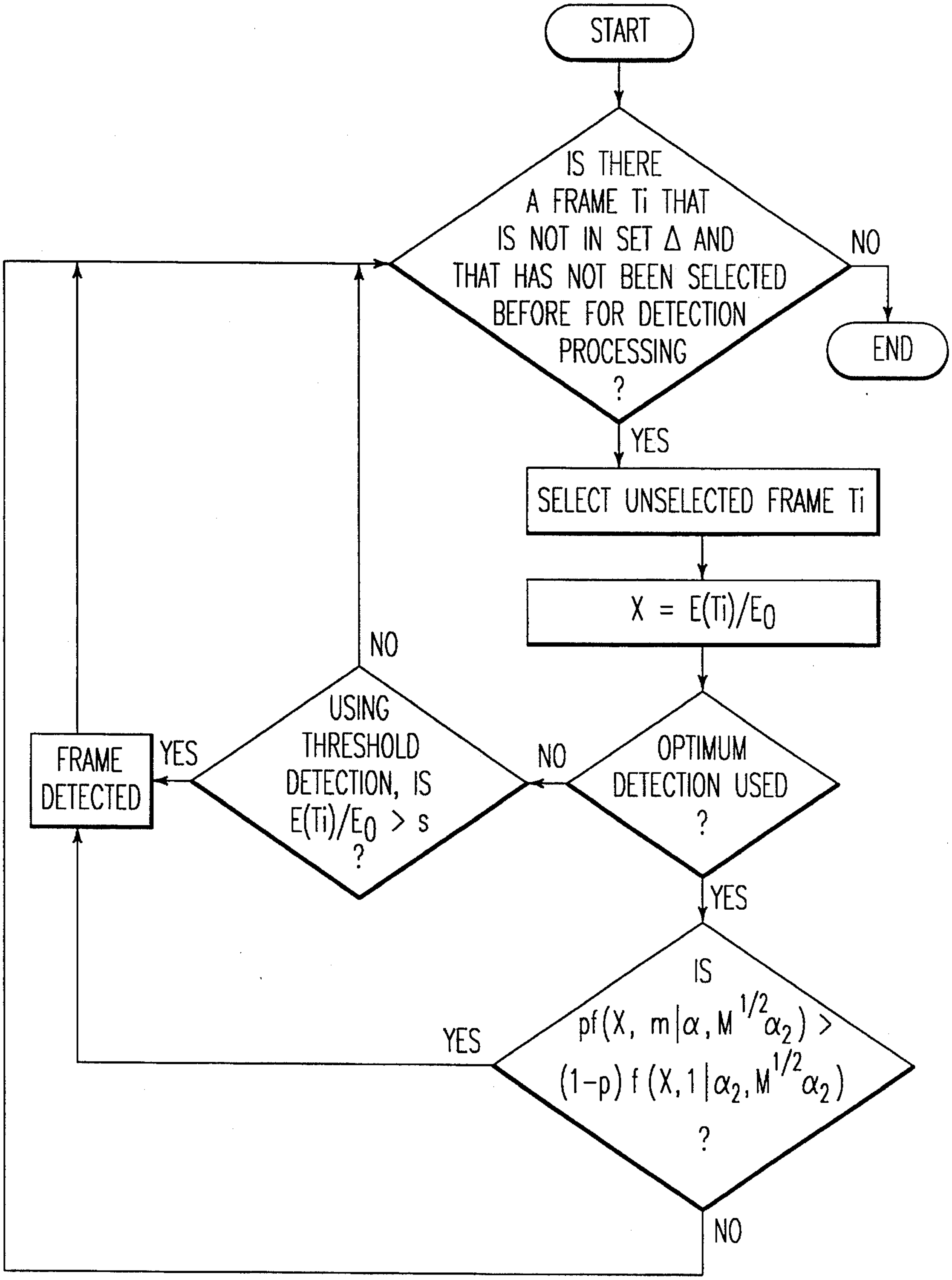
FIG. 4 is a flowchart depicting how a useful frame is detected using frames classified in the preclassification step.

FIG. 1 is a schematic of a computer system used to solve an optimum threshold equation according to the present invention wherein the computer system 2 comprises a computer motherboard 4 which houses a central processing unit (CPU) 6. Connected to the motherboard 4 is a memory card 8 for dynamically storing programs. The stored programs are executed from the memory board 8 by the central processing unit 6. In addition, a receiver board 10 is connected to the motherboard 4 to receive the transmitted useful signal drowned in noise. However, the receiver is not limited to computer applications and may be used in other environments where a useful signal is drowned in noise. The computer system further comprises a digital storage means 12 for storing the program to solve the optimum threshold equation. As is well known, computer systems 2 further comprise input devices (i.e., keyboard 14 and mouse 16) and output devices (i.e., a monitor 18). We consider a distance between energies U and V, but instead of using the normal distance $|U-V|$, the invention uses $|\mathrm{Log}(U/V)|$ which is equivalent to considering that the two energies U and V are close to each other when $1/s<U/V<s$, which is equivalent to $|\mathrm{Log}(U/V)|<\mathrm{Log}(s)$. This distance and the thresholding attached to it are very useful. Consider the case in which the useful signal s(n) and the noise x(n) are both white and Gaussian, the variance of s(n) being $\sigma_s^2$ and the variance of x(n) being $\sigma_x^2$. In the presence of s(n), we observe $U=\Sigma_{0\leq n\leq N-1}u(n)^2$, with $u(n)=s(n)+x(n)$. In the absence of s(n), we observe $V=\Sigma_{0\leq n\leq N-1}x(n)^2$. We can use classical statistical results to write:

$$U\in N(N\sigma_s^2+N\sigma_x^2,2N(\sigma_s^2+\sigma_x^2)^2) \text{ and } V\in N(N\sigma_x^2,2N\sigma_x^4).$$

If U and V are considered as being independent, $$U-V\in N(N\sigma_s^2,2N(\sigma_s^2+\sigma_x^2)^2-2N\sigma_x^4).$$

We will denote the signal to noise ratio $r=\sigma_s^2/\sigma_x^2$. We can then write: $U-V\in N(Nr\sigma_x^2,2N\sigma_x^4[(r+1)^2+1])$. The result depends on $\sigma_x^2$ and r, which demonstrates that thresholding the distance $|U-V|$ is not valid when U/V is not known. However if we consider the U/V ratio, we can demonstrate that the U/V probability density then only depends on r, and is therefore independent of $\sigma_x^2$. This remarkable result validates the use of a threshold on U/V when only r is known.

In summary, in the process according to the invention we can observe L*N samples u(n) of a signal.

Each set $T_i=\{u(iN+k)/k\in\{0, \ldots ,N-1\}\}$,, where i varies from 0 to L−1, is called a frame and is associated with an energy $E(T_i)$ denoted $U_i=E(T_i)$, used to define $E=\{U_i/i\in\{0, \ldots ,L-1\}\}$. When the useful signal is absent, the u(iN+k) samples are exactly equal to noise samples denoted x(iN+k) (u(iN+k)=x(iN+k)). When the useful signal (denoted s(iN+k)) is present, samples u(iN+k) are exactly equal to u(iN+k)=s(iN+k)+x(iN+k). Using a first process described below (the so called pre-classification process), we can find a subset Δ of elements of E that are probably class $C_2$ energies. It is then possible to calculate a self-regressive model of the noise x(n) that will whiten flames that will subsequently be processed, or an average noise spectrum x(n) that can be used to eliminate noise from subsequent frames (neither whitening nor noise elimination are essential but are used depending on the particular context being processed). We then use a second process (the so called detection process) described below, that will detect class $C_1$ energies as well as possible among the elements of E (regardless of whether or not they have been whitened and the noise has been eliminated). Then consider N new samples, combined in the form of a frame associated with a new energy. This new energy may either be used to re-update the Δ set using the preclassification process, or to decide whether or not this new energy belongs to $C_1$, in the sense of a particular aspect of the process, after possible noise elimination or possible whitening. This process is repeated for each acquired frame of N samples. The process according to the invention is characterized by the use of new theoretical signal processing and statistical tools. Thus it makes use of a model of statistical laws that follow signal energies, namely the Positive Gaussian Random Variables (PGRV) model described below. We then use an original property concerning the ratio of two PGRVs.

We will now define the Positive Gaussian Random Variables (PGRV) used by the invention. A random variable X will be said to be positive when $\Pr\{X<0\}<<1$. Let $X_0$ be the normalized centered variable associated with X, this gives: $\Pr\{X<0\}=\Pr\{X_0<-m/\sigma\}$ where $m=E[X]$ and $\sigma^2=E[(X-m)^2]$.

When $m/\sigma$ is sufficiently large, X may be considered as being positive. When X is Gaussian, F(x) is equal to the normal Gaussian variable distribution function and we have: $\Pr\{X<0\}=F(-m/\sigma)$ for $X\in N(m,\sigma^2)$. For a Positive Gaussian Random Variable $X\in N(m,\sigma^2)$, the parameter α of this variable is defined by $\alpha=m/\sigma$, so that we can write $X\in N(m, m^2/\alpha^2)$. Energy models: examples of "positive" Gaussian variables Deterministic energy signal Consider samples x(0), . . . x(N−1) of an arbitrary signal, the energy of which is deterministic and constant, or can be approximated by a deterministic or constant energy (as described below).

We therefore have $U=\Sigma_{0\leq n\leq N-1}x(n)^2\in N(N\mu,0)$ hence $\mu=(1/N)\Sigma_{0\leq n\leq N-1}x(n)^2$ Consider the example of the signal $x(n)=A\cos(n+\theta)$ where θ is uniformly distributed between $[0,2\pi]$.

If N is sufficiently large, we have: $(1/N)\Sigma_{0\leq n\leq N-1}x(n)^2\# E[x(n)^2]=A^2/2$.

If N is sufficiently large, U may be assumed to be equal to $NA^2/2$ and therefore have constant energy.

We will now examine the case of the energy of an arbitrary Gaussian Process. Consider a process x(n), stationary in the second order, but Gaussian with variance $\sigma_x^2$. We demonstrate the following result: $U=\Sigma_{0\leq n\leq N-1}x(n)^2\in N(\mathrm{Tr}(C_{x,N}), 2\mathrm{Tr}(C_{x,N}^2))$, where $C_{x,N}$ is the covariance matrix of the vector $$X={}^t(x(0), \ldots , x(N-1)): C_{x,N}=E[X.{}^tX]$$

Since the process is stationary in the second order, we have $\mathrm{Tr}(C_{x,N})=N\sigma_x^2$.

Therefore $U\in N(N\sigma_x^2,2\mathrm{Tr}(C_{x,N}^2))$ A simple calculation gives $\mathrm{Tr}(C_{x,N}^2)=\Sigma_{0\leq i\leq N-1,0\leq j\leq N-1}\Gamma_x(i-j)^2$ where $\Gamma_x(i)$ is the process correlation function. The α parameter is equal to: $\alpha=\sigma_x^2/(2\mathrm{Tr}(C_{x,N}^2))^{1/2}=N/\{2\ \Sigma_{0\leq i\leq N-1,0\leq j\leq N-1}[\Gamma_x(i-j)/\Gamma_x(0)]^2\}^{1/2}$ This variable will be a positive Gaussian variable if the correlation function allows it. Interesting special cases are described below, and can be used to access this self-correlation function.

Case of the energy of a White Gaussian Process.

We will consider the case of a white Gaussian process x(n) where n is between 0 and N−1. Samples are independent and all have the same variance $\sigma_x^2=E[x(n)^2]$.

We therefore have $C_{x,N}=\sigma_x^2I_N$, where $I_N$ is the identity matrix of dimension NxN.

We deduce: $\mathrm{Tr}(C_{x,N}^2)=N\sigma_x^4$ so that: $U=\Sigma_{0\leq n\leq N-1}x(n)^2\in N(N\sigma_x^2;2N\sigma_x^4)$.

The α parameter is $\alpha=(N/2)^{1/2}$

Case of the energy of a Narrow Band Gaussian Process. It is assumed that the digital signal x(n) is derived from sampling the process x(t), itself derived from filtering a Gaussian white noise b(t) by a pass-band filter h(t) with transfer function: $H(f)=U_{[-f0-B/2,-f0+B/2]}(f)+U_{[f0-B/}2,f0+B/2](f)$, where U denotes the characteristic function of the interval in the subscript and $f_0$ is the central frequency of the filter.

The correlation function $\Gamma_x(\tau)$ of x(t) is equal to $\Gamma_x(\tau)=\Gamma_x(0)\cos(2\pi f_0\tau)\sin_c(\pi B\tau)$ where $\sin_c(x)=\sin(x)/x$.

The correlation function of x(n) is then: $\Gamma_x(k)=\Gamma_x(0)\cos(2\pi kf_0T_e).\sin_c(\pi kBT_e)$.

If $g_{f0,B,Te}(k)=\cos(2\pi kf_0T_e)\sin_c(\pi kBT_e)$, we have: $\mathrm{Tr}(C_{x,N}^2)=\Gamma_x(0)^2\Sigma_{0\leq i\leq N-1,0\leq j\leq N-1}g_{f0,B,Te}(i-j)^2$.

We have: $U\in N(N\sigma_x^2,\ 2\sigma_x^4\Sigma 0\leq i\leq N-1,0\leq j\leq N-1^g f0,B,Te((i-j)^2)$. This variable is a positive Gaussian random variable. The α parameter of this variable is $\alpha=N/[2\Sigma_{0\leq i\leq N-1,0\leq j\leq N-1}g_{f0,B,Te}(i-j)^2]^{1/2}$ These relations remain valid even if $f_0=0$.

Case of the energy of an arbitrary "subsampled" Gaussian process. This model is more practical than theoretical. If the correlation function is known, we do know that: $\lim_{k\to+\infty} \Gamma_x(k)=0$. Therefore for k large enough such that $k>k_0$, the correlation function tends towards 0. Furthermore, instead of processing a series of samples x(0) . . . x(N−1), we can process the sub-series x(0), $x(k_0)$, $x(2k_0)$, . . . , and the energy associated with this series remains a positive Gaussian random variable, provided that there are enough points in this subseries to be able to apply approximations due to the central-limit theorem.

This procedure may make it possible to apply the decision rules described below in some difficult cases. Fundamental theoretical result.

If $X=X_1/X_2$ where $X_1$ and $X_2$ are both Gaussian and independent, such that: $X_1\in N(m_1;\sigma_1^2)$ and $X_2\in N(m_2;\sigma_2^2)$. We have $m=m_1/m_2$, $\alpha_1=m_1/\sigma_1$, $\alpha_2=m_2/\sigma_2$.

When $\alpha_1$ and $\alpha_2$ are large enough to be able to assume that $X_1$ and $X_2$ are positive Gaussian random variables, the probability density $f_X(x)$ of $X=X_1/X_2$ may be approximated by:

$$f_X(x)=(2\pi)^{-1/2}\alpha_1\alpha_2 m\frac{\alpha_1^2x+\alpha_2^2m}{(\alpha_1^2x^2+\alpha_2^2m^2)^{3/2}}\,e^{-\frac{\alpha_1^2\alpha_2^2(x-m)^2}{2(\alpha_1^2x^2+\alpha_2^2m^2)}}\,U(x)$$

where U(x) is the $R^+$ indicatrix function: U(x)=1 if $x\leqq 0$ and U(x)=0 if $x\leqq 0$.

If $$h(x,m|\alpha_1,\alpha_2)=\alpha_1\alpha_2\frac{x-m}{(\alpha_1^2x^2+\alpha_2^2m^2)^{1/2}},\ P(x,m|\alpha_1,\alpha_2)=F[h(x,y|\alpha,\beta)]$$

where F denotes the distribution function of the Gaussian variable, and where $P(x,m|\alpha_1,\alpha_2)=Pr\{X<x\}$ Furthermore:

$$f(x,y|\alpha_1,\alpha_2)=\frac{\partial P(x,m|\alpha_1,\alpha_2)}{\partial x}$$

In the rest of this document, when PGRV pairs characterized by the $\alpha_1$, $\alpha_2$ and m parameters are used, it is assumed that the values of these fixed parameters are known in advance or by heuristics.

We will now describe the pre-classification step of the process according to the invention. It is assumed that $C_1=N(m_1, \sigma_1^2)$ represents observable energies in the presence of a useful signal, and that $C_2=N(m_2, \sigma_2^2)$ represents observable energies in the absence of a useful signal. Let $m=m_1/m_2$, $\alpha_1=m_1/\sigma_1$ and $\alpha_2=m_2/\sigma_2$ and assume that $\alpha_1$ and $\alpha_2$ are sufficiently large so that the elements of $C_1$ and of $C_2$ are PGRVs.

$E=\{U_1, \ldots, U_n\}$ is the set of energies available. Each of these energies $U_i$ is equal to $U_i=\Sigma_{0\leq k\leq N-1}u_i(k)^2$, where $u_i(k)$ are samples of the frame $T_i$ for k varying from 0 to N−1, and N is the number of these samples $u_i(k)$, in other words the length of $T_i$ frames. Energies $U_i$ are assumed to be independent of each other. The pre-classification step attempts to demonstrate some energies only, that are probably class $C_2$ energies. This step makes use of the concepts presented below.

Concept of compatibility between energies:

Let $(U, V)\in(C_1UC_2)X(C_1UC_2)$ and X=U/V. The following assumptions are defined:

$H_1:(U,V)\in(C_1XC_1)U(C_2UC_2)$ and $H_2:(U, V)\in(C_1XC_2)U(C_2UC_1)$. If we have: $1/s<X<s$ ⬌ it is decided that U and V belong to the same class, in other words $H_1$ is considered to be true. We can say that U and V are compatible. This decision will be denoted $D_1$. But if we have $X<1/s$ or $X>s$ ⬌ it is decided that U and V do not belong to the same class, in other words $H_2$ is considered to be true. We say that U and V are incompatible. This decision will be denoted $D_2$.

If $I=[1/s,s]$, the rule is expressed as $x\in I$ ⬌ $D=D_1$, $x\in R-I$ ⬌ $D=D_2$. An attempt is made to optimize this decision rule which will be used to associate generations of random variables with each other. This is done by calculating the optimum threshold s. This calculation varies depending on whether or not the probability, p, is known. When p is known, the maximum probability criterion is applied directly. When p is unknown, and since there are only two assumptions, the Neyman-Pearson criterion is used. Maximum Probability criterion:

We show that the correct decision probability is:

$$P_c=p^2[2P(s,1|\alpha_1,\alpha_1)-1]+(1-p)^2[2P(s,1|\alpha_2,\alpha_2)-1]$$
$$+2p(1-p)[2-P(s,1/m|\alpha_1,\alpha_2)-P(s,m|\alpha_1,\alpha_2)]$$

The optimum threshold s satisfies $$\frac{\partial P_c}{\partial s}=0.$$

$$\frac{\partial P_c}{\partial s}=0 \Leftrightarrow p^2f(s,1|\alpha_1,\alpha_1)+(1-p)^2f(s,1|\alpha_2,\alpha_2)=$$
$$p(1-p)[f(s,1/m|\alpha_1,\alpha_2)+f(s,m|\alpha_1,\alpha_2)]$$

This equation is solved on a computer, when the values m, p, $\alpha_1$ and $\alpha_2$ have been defined. Neyman-Pearson criterion:

When p is unknown, a Neyman-Pearson type approach is used. We will say that detection occurs if the decision $D_1$ has been made, in other words if it is decided that the two random variables are of the same class. The non-detection probability, $P_{nd}$ and the false alarm probability, $P_{fa}$ are then defined by: $P_{nd}=Pr\{D_2|H_1\}$ (probability of deciding on incompatibility when the variables are in the same class) and $P_{fa}=Pr\{D_1|H_2\}$ (probability of deciding on compatibility when the variables are incompatible). The Neyman-Pearson criterion consists of minimizing $P_{nd}$ when $P_{fa}$ is fixed (or vice versa). This type of criterion is applicable when one error is much more serious than the other. Since the objective here is to know whether or not the random variables observed belong to the same class, it is obvious that the objective is to find only a small number of errors in generations assumed to be generations of variables belonging to the same class. Therefore $P_{fa}$ will be fixed so as to give a very small number of false alarms.

$$P_{fa}=1+P(1/s,m|\alpha_1,\alpha_2)-P(s,m|\alpha_1,\alpha_2)\text{ and}$$

$$P_{nd}=1-\frac{p^2[2P(s,1|\alpha_1,\alpha_1)-1]+(1-p)^2[2P(s,1|\alpha_2,\alpha_2)-1]}{p^2+(1-p)^2}$$

such that when $\alpha_1\neq\alpha_2$, $P_{nd}$ depends on p, which is unknown and is inaccessible.

In the case in which $\alpha_1=\alpha_2=\alpha$, then $P_{nd}=2.P(s,1|\alpha,\alpha)-1$ and is therefore accessible. In this case we can fix $P_{nd}$. Having the expression of $P_{fa}$ (or $P_{nd}$), this probability can be fixed so that the corresponding threshold s can be obtained.

Compatibility between several energies.

When the threshold has been calculated using one of the two procedures mentioned above, it is interesting to generalize this concept of compatibility between several energies. Consider $U_1, \ldots, U_N$, N energies, we will say that these energies are compatible with each other if, and only if, $\forall$ i and j, $U_i$ and $U_j$ are compatible in the sense mentioned above, in other words if all energies are compatible in pairs.

The following assumptions are made in using this procedure:

energies in class $C_2$ are statistically lower than energies in class $C_1$;

the frame with the lowest energy is a $C_2$ class frame. Let this frame be $T_{i0}$, The calculation then takes place as follows:

The $\Delta$ set is initialized: $\Delta = \{T_{i0}\}$;

FOR $i$ describing $\{E(T_1), \ldots, E(T_n)\} - \{E(T_{i0})\}$

DO

If $E(T_i)$ is compatible with each element of $\Delta$: $\Delta = \Delta U\{E(T_i)\}$.

END FOR

The noise confirmation process provides a number of frames that may be considered to be noise, with a very high probability. Using the temporal samples as data, we calculate a self-regressive model of the noise. If x(n) denotes noise samples, we model x(n) using $x(n)=\Sigma_{1 \leqq i \leqq p}\alpha_i x(n-i)+e(n)$, where p is the order of the model, $a_i$ are model coefficients to be determined and e(n) is the model noise, assumed to be white and Gaussian if a maximum probability approach is used. This type of model is widely described in the literature, and particularly in "Spectrum Analysis—A modern Perspective", S. M. KAY/S. L. MARPLE JR., Proceedings of the IEEE, Vol. 69, No. 11, November 1981. Many procedures are available for the model calculation routines (Burg, Levinson-Durbin, Kalman, Fast Kalman . . .). It is beneficial to use the Kalman and Fast Kalman procedures: "Le Filtrage Adaptatif Transverse" (Transverse Adaptive Filtering), O. MACCHI, M. BELLANGER, Traitement du signal (Signal Processing), Vol. 5, No. 3, 1988 and "Analyse des signaux et filtrage num érique adaptatif" (Analysis of signals and Adaptive Digital Filtering), M. BELLANGER, Collection CNETENST, MASSON, that have very good real time performances. When a self-regressive noise model is available, it is easy to whiten this noise, making it possible to work on white Gaussian noise that is easily manipulated.

Let u(n)=s(n)+x(n) be the total signal composed of the useful signal s(n) and noise x(n). Let the filter $H(z)=1-\Sigma_{1 \leqq i \leqq p}\alpha_i z^{-i}$. When applied to the U(z) signal, it becomes H(z)U(z)=H(z)S(z)+H(z)X(z). But H(z)X(z)= E(z)⇒H(z) U(z)=H(z)S(z)+E(z). The rejecter filter H(z) whitens the signal such that the signal at the output from this filter is a useful signal (filtered and therefore deformed), plus a generally white and Gaussian noise. Working on white noise makes it possible to approximate ideal assumptions, particularly when applying the detection process. However whitening is not essential and the detection procedure may be used without this intermediate step.

Since a number of flames confirmed as being noise are available after using the process according to the invention, we can also calculate an average spectrum of this noise in order to implant special spectral subtraction or WIENER filtering, that is widely described in the literature: "Suppression of Acoustic Noise in Speech Using Spectral Subtraction" S. F. BOLL, IEEE Transactions on Acoustics, Speech, and Signal Processing, Vol. ASSP-27, No. 2, April 1979; "Enhancement and Bandwidth Compression of Noisy Speech", J. S. LIM, A. V. OPPENHEIM, Proceedings of the IEEE, Vol. 67, No. 12, December 1979, et "Noise Reduction For Speech Enhancement In Cars: Non-Linear Spectral Subtraction, Kalman Filtering", P. LOCKWOOD, C. BAILLARGEAT, J. M. GILLOT, J. BOUDY, G. FAUCON, EUROSPEECH 91. This aspect may be interesting in some applications, for example see: "Procédé de détection de la parole" (Speech Detection Process), D. PASTOK, French patent application No 92 12582, registered on 21.10.92.

Detection according to the process using the invention.

Given a set, Δ, the components of which are probably energies in class $C_2$ (after possible whitening), an attempt is made to detect class $C_1$ energies using these references. If V is the average value of energies in the set Δ, this variable is also a PGRV. If $\Delta=\{V_1, \ldots, V_M\}$, we have $\forall\ i \in \{1, \ldots, M\}$, $V_i \in N(m_2,\sigma_2^2)$ using the same notations as above. $E_o=(1/M)\Sigma_{1 \leqq i \leqq M}V_i \in N(m_2,(1/M)\sigma_2^2)$ since each $V_i$ is independent. Let $m=m_1/m_2$, $\alpha_1=m_1/\sigma$ and $\alpha_2=m_2/\sigma_2$.

We then use the optimum decision role. Application of the maximum probability criterion (the correct decision probability p is known): let $p=Pr\{U \in C_1\}$. The optimum decision role is then: $pf(x,m|\alpha_1,M^{1/2}\alpha_2)>(1-p)f(x,1|\alpha_2, M^{1/2}\alpha_2) \Leftrightarrow D=D_1$ $pf(x,m|\alpha_1,M^{1/2}\alpha_2)<(1-p)f(x,1|\alpha_2, M^{1/2}\alpha_2) \Leftrightarrow D=D_2$ Application of the Neyman-Pearson criterion:

When the value of p is unknown, we can:

either fix it arbitrarily by a heuristic approach, or fix it at p=0.5, which is the worst case, or use the Neyman-Pearson criterion or the median criterion that consists of having: probability of false alarm=probability of non-detection.

If we use the Neyman-Pearson criterion or the median criterion, the detection rule will be in the following form: $f(x,m|\alpha_1,M^{1/2}\alpha_2)/f(x,1|\alpha_2,M^{1/2}\alpha_2)>\lambda \Leftrightarrow D=D_1$ $f(x,m|\alpha_1, M^{1/2}\alpha_2)/f(x,1|\alpha_2,M^{1/2}\alpha_2)>\lambda \Leftrightarrow D=D_2$ The threshold λ is fixed to give an initial value of the probability of a false alarm (or the probability of a correct decision).

This false alarm probability $P_{FA}$ is equal to:

$$P_{FA}=Pr\left\{\frac{f(X,m|\alpha_1,M^{1/2}\alpha_2)}{f(X,m|\alpha_1,M^{1/2}\alpha_2)}>\lambda | X \in C_2\right\}$$

No simple theoretical calculation has been found for this expression, therefore there is no theoretical way of evaluating the threshold λ. However λ may be calculated by simulation, depending on the specific case being considered. The simplified decision role described below is more practical to use in this case. Simplified decision rule:

This rule is: $x>s \Leftrightarrow U \in C_1, x>s \Leftrightarrow U \in C_2$

Case of maximum probability criterion: The correct decision probability $P_c$ is:

$$P_c=p[1-P(s,m|\alpha_1,M^{1/2}\alpha_2)]+(1-p)P(s,1|\alpha_2,M^{1/2}\alpha_2)$$

The optimum threshold is obtained for:

$$\frac{\partial P_c}{\partial s}=0 \Leftrightarrow pf(s,m|\alpha_1,M^{1/2}\alpha_2)-(1-p)f(s,1|\alpha_2,M^{1/2}\alpha_2)=0$$

Case of Neyman-Pearson criterion: When the probability p is unknown, we can:

either fix it arbitrarily using a heuristic approach, or fix it at p=0.5, which is the worst case, or use the Neyman-Pearson criterion or the median criterion that consists of having the false alarm probability=non-detection probability.

In order to apply the Neyman-Pearson criterion or the median criterion, we define the non-detection and false alarm probabilities:

$P_{nd}=\{x<s|H_1 et\ P_{fa}=\{x>s|H_2\}$

We have: $P_{nd}=P(s,1|\alpha_2, M^{1/2}\alpha_2) et\ P_{fa}=1-P(s,m|\alpha_1,M^{1/2}\alpha_2)$ We then fix $P_{fa\ or\ Pnd}$, to determine the value of the threshold.

The median criterion gives:

$$P_{fa}=P_{nd} \Leftrightarrow P(s,1|\alpha_2,M^{1/2}\alpha_2)=1-P(s,m|\alpha_1,M^{1/2}\alpha_2)$$

Implementation.

When the decision rule has been defined using the theoretical tools mentioned above, and given a noise "reference" energy $E_0$, detection is done on $E(T_1), \ldots, E(T_n)$, where:

$$E(T_i)=\Sigma_{0\leq n\leq N-1}u_i(n)^2$$

where $u_i$ (n) are the N samples making up frame $T_i$.

Among the frames available initially, the pre-classification algorithm showed up a set Δ of frames that are almost certainly in the "noise" class. The average energy of frames in set Δ is used to obtain a reference value $E_o$ that the detection algorithm will use to classify the energies of frames other than those in set Δ, and new frames acquired later.

FOR $E(T_i)$ describing $\{E(T_1), \ldots, E(T_n)\}$

DO $X = E(T_i)/E_0$

Case of optimum detection:

If $pf(X,m|\alpha_1,M^{1/2}\alpha_2) > (1-p)f(X,1|\alpha_2,M^{1/2}\alpha_2)$, detection on frame $T_i$.

Case of a threshold detection:

IF $X > s$ detection on frame $T_i$

END FOR

FOR each new frame $T$ represented by samples $u(0), \ldots, u(N-1)$,

DO $E = \Sigma_{0\leq n\leq N-1}u(n)^2$ $X = E(T_i)/E_0$

Case of optimum detection.

If $pf(X,m|\alpha_1,M^{1/2}\alpha_2) > (1-p)f(X,1|\alpha_2,M^{1/2}\alpha_2)$, detection on frame $T_i$ Case of a threshold detection.

IF $X > s$ Detection on frame $T_i$ (if there is no detection, the acquired frame may be considered as noise and may be used to update Δ and the reference value $E_o$).

END FOR

Application examples.

A large number of examples can be given to demonstrate the advantage of the process according to the invention. There are as many examples as there are pairs of models that can be formed from the models described above (see PGRV examples given above):

detection of white Gaussian noise in another white Gaussian noise;

detection of white Gaussian noise in a narrow band Gaussian noise;

detection of deterministic energy in a narrow band Gaussian noise . . .

Detection of a bounded energy signal in a narrow band Gaussian noise:

Assumption 1: we assume that the useful signal is not known in its form, but we will make the following assumption: for every generation (0), . . . , s(N−1) of s(n), the energy S defined by: $S=(1/N)\Sigma_{0\leq n\leq N-1}\ s(n)^2$ is bounded by $\mu_s^2$, whenever N is sufficiently large, such that: $S=\Sigma_{0\leq n\leq N-1}\ s(n)^2>N\mu_s^2$.

Assumption 2: The useful signal is disturbed by an additive noise denoted x(n) that is assumed to be Gaussian and narrow band. It is assumed that the processed function x(n) is obtained by narrow band filtering of Gaussian white noise.

The correlation function of this process is then:

$$\Gamma_x(k)=\Gamma_x(0)\cos(2\pi k f_0 T_e)\ \mathrm{sin}_c(\pi k B T_e)$$

If we consider n sample(s) of this noise, we then have: $V=(1/N)\Sigma_{0\leq n\leq N-1}x(n)^2\in N(N\sigma_x^2, 2\sigma_x^4\Sigma_{0\leq i\leq N-1,0\leq j\leq N-1}g_{f0,B,Te}(i-j)^2)$ where: $g_{f0,B,Te}(k)=\cos(2\pi k f_0 T_e)\mathrm{sin}_c(\pi k B T_e)$ The α parameter of this variable is:

$$\alpha=N/[2\Sigma_{0\leq i\leq N-1}g_{f0,B,Te}(i-j)^2]^{1/2}$$

Assumption 3: The s(n) and x(n) signals are assumed to be independent. It is assumed that independence between s(n) and x(n) implies decorrelation in the temporal sense of the term, in other words that we can write:

$$c=\frac{\Sigma_{0\leq n\leq N-1}s(n)x(n)}{(\Sigma_{0\leq n\leq N-1}s(n)^2)^{1/2}(\Sigma_{0\leq n\leq N-1}x(n)^2)^{1/2}}=0$$

This correlation coefficient is only the expression of the spatial correlation defined by the following, in the time domain: $E[s(n)x(n)]/(E[s(n)^2]E[x(n)^2])^{1/2}$ when all processes are ergodic. Let u(n)=s(n)+x(n) be the total signal, and $U=\Sigma_{0\leq n\leq N-1}\ u(n)^2$. U is approximated by: $U=\Sigma_{0\leq n\leq N-1}s(n)^2+\Sigma_{0\leq n\leq N-1}x(n)^2$ Since we have: $\Sigma_{0\leq n\leq N-1}\ (s(n)^2\geq\mu_s^2$ we will have: $U\geq N\mu_s^2+\Sigma_{0\leq n\leq N-1}\ x(n)^2$.

Assumption 4: Since we assume that the signal has a bounded mean energy, we will assume that a process capable of detecting an energy $\mu_s^2$, will be capable of detecting any signal with higher energy.

Making use of the previous assumptions, class $C_1$ is defined as being the energy class when the useful signal is present. According to assumption 3, $U\geq N\mu_s^2+\Sigma_{0\leq n\leq N-1}\ x(n)^2$, and according to assumption 4, if we detect energy $N\mu_s^2+\Sigma_{0\leq n\leq N-1}\ x(n)^2$ we will also be able to detect the total energy U.

According to assumption 2, $N\mu_s^2+\Sigma_{0\leq n\leq N-1}\ x(n)^2 \in N(N\mu_s^2+N\sigma_x^2, 2\sigma_x^4\Sigma_{0\leq i\leq N-1,0\leq j\leq N-1}g_{f0,B,Te}(i-j)^2)$.

Therefore $C_1=N(N\mu_s^2+N\sigma_x^2, 2\sigma_x^4\Sigma_{0\leq i\leq N-1,0\leq j\leq N-1}g_{f0,B,Te}(i-j)^2)$ and the α parameter of this variable is equal to:

$$\alpha_1=N(1+r)/[2\Sigma_{0\leq i\leq N-1,0\leq j\leq N-1}g_{f0,B,Te}(i-j)^2]^{1/2},\ \text{where}\ r=\mu_s^2/\sigma_x^2$$

represents the signal to noise ratio.

$C_2$ is the class of energies corresponding to the noise alone. According to assumption 2, if noise samples are x(0), . . . ,x(M−1), we have:

$$V=(1/M)\Sigma_{0\leq n\leq M-1}x(n)^2\in N(M\sigma_x^2, 2\sigma_x^4\Sigma_{0\leq i\leq M-1,0\leq j\leq M-1}g_{f0,B,Te}(i-j)^2)$$

The $\alpha$ parameter for this variable is:

$$\alpha_2=M/[2\Sigma_{0\leq i\leq M-1,0\leq j\leq M-1}g_{f0,B,Te}(i-j)^2]^{1/2}$$

We therefore have:

$C_1=N(m_1,\sigma_1^2)$ and $C_2=N(m_2,\sigma_2^2)$, where: $m_1=N\mu_s^2+N\sigma_x^2$, $m_2=M\sigma_x^2$, $\sigma_1=\sigma_x^2[2\Sigma_{0\leq i\leq N-1,0\leq j\leq N-1}g_{f0,B,Te}\ (i-j)^2]^{1/2}$ and $\sigma_2=\sigma_x^2[2\Sigma_{0\leq i\leq M-1,0\leq j\leq M-1}g_{f0,B,Te}(i-j)^2]^{1/2}$ Hence $m=m_1/m_2=(N/M)(1+r)$, $\alpha_1=m_1/\sigma_1=N(1+r)/[2\Sigma_{0\leq i\leq N-1,0\leq j\leq N-1}g_{f0,B,Te}\ (i-j)^2]^{1/2}$ and $\alpha_2=m_2/\sigma_2=M/[2\Sigma_{0\leq i\leq M-1,0\leq j\leq M-1}g_{f0,B,Te}(i-j)^2]^{1/2}$.

We can then use the steps in the process according to the invention described above.

PN code detection

We consider a BPSK modulation spread by a PN code of length L that is very much larger than 1. The transmission duration of a binary element $d_n$ is $T_b$. The transmission duration of a binary element of the PN code is T'.

During an interval of $[nT_b,(n+1)T_b]$, the emitted signal is: $m(t)=(2E_b/T_b)^{1/2}d_n\Sigma_{0\leq k\leq K-1}c_k\Lambda_{[kT',(K+1)T']}\ (t)\ \cos(\omega_0t+\phi)$ where:

$\Lambda_{[kTc,(K+1)Tc]}(t)=1$ if $t\in[kT',(k+1)T']$ and $\Lambda_{kT',(k+1)T']}(t)=0$ if $t\in[kT',(k+1)T']$, K denotes the number of samples of the PN code seen in this interval, and $\phi$ is the random phase uniformly distributed around $[0,2\pi]$ This emitted signal is drowned in background noise which is b(t), assumed to be white and Gaussian.

We then attempt to detect the signal s(t) starting from the received signal r(t)=m(t)+b(t), assuming that the PN code is not known, therefore nor are the values of $c_k$, or the duration L, the time $T_b$, or the frequency $\omega_0$.

Then consider the random variable:

$$u(n)=(2/T)^{1/2}\int_{nT}^{(n+T)\cdot T} r(t)\cos(\omega t)dt,\ \text{where:}$$

T is an integration period long enough so that samples of the PN code seen during this interval are sufficiently numerous and decorrelated, while remaining low enough to remain below the periodicity L of the PN code. If K is the number of binary elements of the PN code seen in this interval, we therefore assume that: L>>1, K<<L and K>>1. T also satisfies $\omega_0T>>1$ $\omega$ is a frequency used to attempt to recover the carrier, such that $\omega T>>1$ Let:

$$s(n)=(2/T)^{1/2}\int_{nT}^{(n+1)\cdot T} m(t)\cos(\omega t)dt$$

and:

$$x(n)=(2/T)^{1/2}\int_{nT}^{(n+1)\cdot T} b(t)\cos(\omega t)dt$$

$$u(n)=s(n)+x(n),$$

$$s(n)=(2E_b/T_b)^{1/2}\,d_n\Sigma_{0\leq k\leq K-1}\,c_K\int_{nT+kT}^{nT+(k+1)T}\cos(\omega_0t+\phi)\cos(\omega t)dt$$

Using the central-limit theorem, and according to calculations similar to those described in "Performance of a Direct Sequence Spread Spectrum System with Long Period and Shod Period Code Sequences", R. SINGH, IEEE Transactions on Communications, Vol. Com-31, No. 3, March 1983, we can show that s(n) is a Gaussian variable with zero average and variance: $\sigma_s^2=(T_b/T)(E_b/2K)\sin_c^2(\pi(\omega-\omega_0)/K)$.

In practice, it is assumed that each s(n) is independent, such that the series of sample s(n) forms a discrete white Gaussian process.

Similarly, the series of samples x(n) forms a white Gaussian function with zero average and variance $\sigma_x^2=\sigma_b^2$. Detecting the PN code depends on detecting s(n), therefore detecting white Gaussian noise drowned in another white Gaussian noise.

Consider therefore the variable $U=\Sigma_{0\leq n\leq N-1}\ u(n)^2$. Using the results mentioned above for PGRVs, we have:

$$U\in N(N(\sigma_s^2+\sigma_x^2);\ 2N(\sigma_s^2+\sigma_x^2)^2).$$

The $\alpha$ parameter for this variable is $\alpha_1=(N/2)^{1/2}$

Then consider the variable $V=\Sigma_{0\leq n\leq M-1}\ x(n)^2$. We have: $V\in N(M\sigma_x^2;\ 2M\sigma_x^4)$.

The $\alpha$ parameter for this variable is $\alpha_2=(M/2)^{1/2}$. We can therefore use the same model as for the case of detection between two classes:

$$C_1=N(N(\sigma_s^2+\sigma_x^2);\ 2N(\sigma_s^2+\sigma_x^2)^2)\ et\ C_2=N(M\sigma_x^2;\ 2M\sigma_x^4).$$

We then have: $m=(N/M)(1+r)$, $\alpha_1=(N/2)^{1/2}$, $\alpha_2=(M/2)$ ½ Note that if $N=M\Rightarrow\alpha_1=\alpha_2=(N/2)^{1/2}$ The procedure described above is therefore applicable to this problem.

I claim:

1. A process for detecting a transmitted useful signal drowned in noise, comprising the steps of:

receiving a noisy signal;

partitioning a portion of the received noisy signal into L frames of N samples;

calculating energies of each of said L frames;

determining an optimum threshold, s;

preclassifying M of said L frames into a set $\Delta$ by using a predetermined set of ratios, m, $\alpha_1$ and $\alpha_2$ which define characteristic signal-to-noise ratios of the noisy signal;

calculating an average noise energy value, $E_0$, from the frames in $\Delta$ as determined in the preclassifying step; and detecting for each frame not in set $\Delta$ if a useful signal exists by using the average noise energy value, $E_0$.

2. The process according to claim 1, wherein the step of preclassifying comprises the steps of:

(a) determining a frame, $T_{i0}$, with the lowest energy, $E(T_{i0})$, of said L frames;

(b) assigning frame $T_{i0}$ to set $\Delta$ such that $\Delta=\{T_{i0}\}$;

(c) selecting a current frame, $T_i$, from frames $T_1 \ldots T_L$ which is not in $\Delta$;

(d) determining if $1/s<E(T_i)/E(T_j)<s$ for each element, Tj, in set $\Delta$;

(e) adding $T_i$ to $\Delta$ if $1/s<E(T_i)/E(T_j)<s$, as determined in step (d); and (f) repeating steps (c) through (d) until all frames except $T_{i0}$ have been selected.

3. The process according to claim 1, wherein the step of determining an optimum threshold, s, comprises:

calculating the optimum threshold, s, using the maximum probability criterion when the correct decision probability is known.

4. The process according to claim 1, wherein the step of determining an optimum threshold, s, comprises:

calculating the optimum threshold, s, using the Neyman-Pearson criterion when the correct decision probability is not known.

5. The process according to claim 1, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$, p=the maximum probability criterion when the correct decision probability is known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x,m|\alpha_1,\alpha_2)=Pr\ \{X<x\}$, $P(x,m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

6. The process according to claim 1, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$ where p is calculating by using the Neyman-Pearson criterion when the correct decision probability is not known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x, m|\alpha_1,\alpha_2)=Pr\ \{X<x\}$, $P(x, m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

7. The process according to claim 1, wherein the step of detecting detects a useful frame if $E(T_i)/E_0>s$ is true when using threshold detection.

8. A process for detecting a transmitted useful signal drowned in noise, comprising the steps of:

receiving a noisy signal;

partitioning a portion of the received noisy signal into L frames of N samples;

calculating energies of each of said L frames;

determining an optimum threshold, s;

preclassifying M of said L frames into a set Δ by using a predetermined set of ratios, m, $\alpha_1$ and $\alpha_2$ which define characteristic signal-to-noise ratios of the noisy signal;

calculating an average noise energy value, $E_0$, from the frames in Δ as determined in the preclassifying step;

whitening each of said L frames not in α; and detecting for each frame not in set Δ if a useful signal exists by using the average noise energy value, $E_0$.

9. The process according to claim 8, wherein the step of preclassifying comprises the steps of:

(a) determining a frame, $T_{i0}$, with the lowest energy, $E(T_{i0})$, of said L frames;

(b) assigning frame $T_{i0}$ to set Δ such that $\Delta=\{T_{i0}\}$;

(c) selecting a current frame, $T_i$, from frames $T_1 \ldots T_L$ which is not in Δ;

(d) determining if $1/s<E(T_i)/E(T_j)<s$ for each element, Tj, in set Δ;

(e) adding $T_i$ to Δ if $1/s<E(T_i)/E(T_j)<s$, as determined in step (d); and (f) repeating steps (c) through (d) until all frames except $T_{i0}$ have been selected.

10. The process according to claim 8, wherein the step of determining an optimum threshold, s, comprises:

calculating the optimum threshold, s, using the maximum probability criterion when the correct decision probability is known.

11. The process according to claim 8, wherein the step of determining an optimum threshold, s, comprises:

calculating the optimum threshold, s, using the Neyman-Pearson criterion when the correct decision probability is not known.

12. The process according to claim 8, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$, p=the maximum probability criterion when the correct decision probability is known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x,m|\alpha_1,\alpha_2)=Pr\ \{X<x\}$, $P(x,m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

13. The process according to claim 8, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$ where p is calculating by using the Neyman-Pearson criterion when the correct decision probability is not known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x, m|\alpha_1,\alpha_2)=Pr\ \{X<x\}$, $P(x, m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

14. The process according to claim 8, wherein the step of detecting detects a useful frame if $E(T_i)/E_0>s$ is true when using threshold detection.

15. A process for detecting a transmitted useful signal drowned in noise, comprising the steps of:

receiving a noisy signal;

partitioning a portion of the received noisy signal into L frames of N samples;

calculating energies of each of said L frames;

determining an optimum threshold, s;

preclassifying M of said L frames into a set Δ by using a predetermined set of ratios, m, $\alpha_1$ and $\alpha_2$ which define characteristic signal-to-noise ratios of the noisy signal;

calculating an average noise energy value, $E_0$, from the frames in Δ as determined in the preclassifying step;

filtering each of said L frames not in Δ; and detecting for each frame not in set Δ if a useful signal exists by using the average noise energy value, $E_0$.

16. The process according to claim 15, wherein the step of preclassifying comprises the steps of:

(a) determining a frame, $T_{i0}$, with the lowest energy, $E(T_{i0})$, of said L frames;

(b) assigning frame $T_{i0}$ to set Δ such that $\Delta=\{T_{i0}\}$;

(c) selecting a current frame, $T_i$, from frames $T_1 \ldots T_L$ which is not in $\Delta$;

(d) determining if $1/s<E(T_i)/E(T_j)<s$ for each element, Tj, in set $\Delta$;

(e) adding $T_i$ to $\Delta$ if $1/s<E(T_i)/E(T_j)<s$, as determined in step (d); and (f) repeating steps (c) through (d) until all frames except $T_{i0}$ have been selected.

17. The process according to claim 15, wherein the step of determining an optimum threshold, s, comprises:

calculating the optimum threshold, s, using the maximum probability criterion when the correct decision probability is known.

18. The process according to claim 15, wherein the step of determining an optimum threshold, s, comprises:

calculating the optimum threshold, s, using the Neyman-Pearson criterion when the correct decision probability is not known.

19. The process according to claim 15, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$, p=the maximum probability criterion when the correct decision probability is known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x,m|\alpha_1,\alpha_2)=\Pr\{X<x\}$, $P(x,m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

20. The process according to claim 15, wherein the step of detecting detects a useful frame if $pf(X,m|\alpha_1,M^{1/2}\alpha_2)>(1-p)f(X,1|\alpha_2,M^{1/2}\alpha_2)$ is true, wherein $X=E(T_i)/E_0$ where p is calculating by using the Neyman-Pearson criterion when the correct decision probability is not known, $$h(x,m|\alpha_1,\alpha_2)=\alpha_1\alpha_2\frac{x-m}{(\alpha_1^2x^2+\alpha_2^2m^2)^{1/2}},$$

F is the distribution function of a Gaussian variable, $P(x, m|\alpha_1,\alpha_2)=\Pr\{X<x\}$, $P(x, m|\alpha_1,\alpha_2)=F[h(x,y|\alpha,\beta)]$ and $$f(x,y|\alpha_1,\alpha_2)=\frac{\partial P(x,m|\alpha_1,\alpha_2)}{\partial x}.$$

21. The process according to claim 15, wherein the step of detecting detects a useful frame if $E(T_i)/E_0>s$ is true when using threshold detection.

* * * * *